United States Patent

Young

[15] 3,636,473
[45] Jan. 18, 1972

[54] COMPOSITE GLASS LASER ROD
[72] Inventor: C. Gilbert Young, Storrs, Conn.
[73] Assignee: American Optical Corporation, Southbridge, Mass.
[22] Filed: Mar. 6, 1969
[21] Appl. No.: 804,750

[52] U.S. Cl. ................................331/94.5, 350/175, 330/4.3
[51] Int. Cl. .......................H01s 3/06, H01s 3/09, H01s 3/16
[58] Field of Search .............331/94.5; 350/175 GN; 330/4.3

[56] References Cited

UNITED STATES PATENTS

| 3,222,615 | 12/1965 | Holly | 331/94.5 |
| 3,455,666 | 7/1969 | Bazinet, Jr. | 331/94.5 X |
| 3,197,715 | 7/1965 | Ashkin | 331/94.5 |

*Primary Examiner*—Ronald L. Wibert
*Assistant Examiner*—R. J. Webster
*Attorney*—Lane, Aitken, Dunner & Ziems and William C. Nealon

[57] ABSTRACT

This specification discloses a composite glass laser rod comprising an inner cylindrical core surrounded by annuli of laser material. The annuli have different levels of doping so that the annuli have different indices of refraction, with the index of refraction of each inner annulus being slightly less than the index of refraction of the adjacent outer annulus.

11 Claims, 3 Drawing Figures

PATENTED JAN 18 1972 3,636,473

INVENTOR
C. GILBERT YOUNG

BY Lane, Aitken, Dunner & Ziems and
William C. Nealon
ATTORNEYS

COMPOSITE GLASS LASER ROD

BACKGROUND OF THE INVENTION

This invention relates to glass laser rods and, more particularly, to a glass laser rod with means to overcome the positive lens effect which arises from the thermal gradient in the rod.

A conventional glass laser is excited to a laser state in which it will amplify light, or in other words lase, by periodically or continuously illuminating the rod with high-intensity flashlamps. This excitation process is called pumping. The pumping of a glass laser rod introduces heat into the rod uniformly per unit volume throughout the rod. Yet heat is extracted from the rod only from the surface of the rod. As a result, in a glass laser rod of the conventional configuration having an axial length much longer than its diameter, a radial thermal gradient is built up. The radial thermal gradient results in a radial gradient in the index of refraction within the laser rod with the index being higher at the center of the rod than it is at the surface of the rod. As a result, the rod acts as a positive lens upon the laser beam and operates to focus the laser beam in the center of the laser rod. This focusing of the laser beam is undesirable because the volume in which the laser action takes place is reduced thus reducing the efficiency of the rod. Moreover, the spread of the laser beam produced by the rod is increased. In most laser applications, minimum beam spread is desired at the target receiving the laser beam in order to deliver maximum energy to the target. In addition, because of the positive lens action of the laser rod, the laser beam can collapse into a destructive filament as a result of self-focusing of the laser beam. Self-focusing of a laser beam causing the laser beam to collapse into a destructive filament occurs because the index of refraction in material, in general, is increased by the high-intensity electric field present in the laser beam. The intensity of a laser beam is usually highest in the center and varies with a guassian distribution from the center outwardly. As a result, the index of refraction in general will be higher at the center of the medium through which the beam is passing than it will at the edge. If the increase in the index of refraction with the electric field in the laser beam is high enough, the beam will collapse due to the resulting dynamic positive lensing effect into a diffraction-limited filament. At this point, the power density in the laser beam will exceed the damage threshold of the material and a fine fossil record is left where the laser beam passes through the material. The self-focusing resulting in the laser beam collapse will occur at a much lower threshold when even a small amount of positive lens power is initially present in the material. Thus, the presence of the thermal radial gradient will lower the threshold at which this beam collapse occurs.

Because of these disadvantages, the rate at which heat is introduced into the glass laser rods of the prior art must be limited so that the thermal lensing effect does not become excessive. A glass laser rod having a diameter of 4 centimeters can only be pumped about once per minute with 100 joules of electrical input to the flashlamp per cubic centimeter of laser glass. A glass laser rod having a diameter of 6 millimeters can be pumped at a rate of one pulse per second with 100 joules of electrical input to the flashlamp per pulse. With the laser rod of the present invention, these pumping rates can be increased by a factor of 10.

In the glass lasers of the prior art, a number of approaches have been employed to overcome the problem of thermal lensing. One manner of overcoming the problem is to employ laser rods having small diameters. However, such laser rods produce relatively low amounts of output energy. Moreover, the beam spread from these rods is high as a result of the diffraction inherent in the use of small rods.

Another way of overcoming the problem of thermal lensing used in the prior art is to place a negative lens in the cavity or use curved mirrors to define the laser cavity to offset the thermally induced lens power. This approach however is operable only for one set of operating conditions. Moreover, when long rods are used at a relatively high operating point, self-focusing may occur within the rod beyond the help of any corrections external to the rod. In addition, the use of these external corrections within the cavity reduces the efficiency of the system and increases its cost. Furthermore, when such external corrections are used, the laser cavity cannot be aligned statically because the thermally induced lens power must be present to balance the externally provided negative correction.

SUMMARY OF THE INVENTION

The composite laser rod of the present invention overcomes the problem of thermal lensing by preventing the thermal gradient present in the rod from focusing the laser beam at the center of the rod. In accordance with the present invention, instead of forming the laser rod out of one homogeneous piece, the rod is formed by a concentric series of laser glass annuli which are fused together to form the composite rod. Each annulus has a slightly different index of refraction than the adjacent laser glass annuli, the index of refraction increasing with increasing radius. With a composite rod formed in this manner, a light ray generally parallel to the axis of the rod and bent toward the axis by the thermally induced lens power of the rod will be reflected by total internal reflection when it encounters an interface between annuli. This reflected light ray will again be bent back by the thermally induced lens power to again be reflected from the same interface. In this manner, the light ray will be trapped within the annulus and will not be focused to the center of the laser rod. A light ray which deviates outward from parallelism may refract into an outer annulus of the rod but will be captured and retained in an outer annulus of the rod. The laser beam is therefore confined in the laser rod by a combined action of the thermal lens power and the total internal reflection achieved at the interface between the annuli. The net effect is that no significant thermal focusing of the beam can occur.

Accordingly, an object of the present invention is to provide an improved glass laser rod.

Another object of the present invention is to overcome the detrimental effects of thermal lensing in laser rods.

A further object of the present invention is to prevent thermal lensing in a laser rod from focusing the laser beam at the center of the rod.

A further object of the present invention is to provide a laser rod into which energy can be pumped at a rate an order of magnitude higher than the laser rods of the prior art.

Further objects and advantages of the present invention will become readily apparent as the following detailed description of the invention unfolds.

DESCRIPTION OF THE PREFERRED EMBODIMENTS

Figure 1:
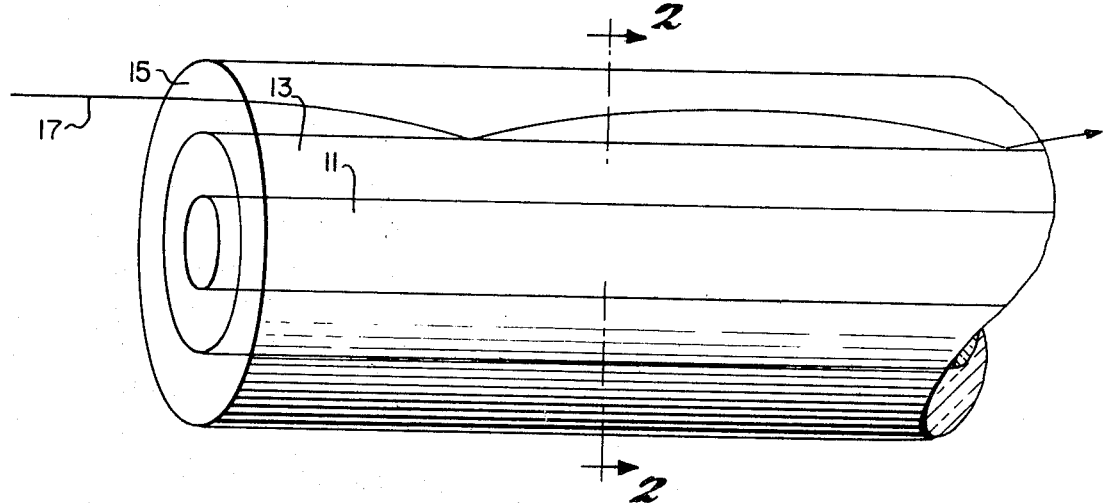
FIG. 1 is a schematic perspective view illustrating a portion of the laser rod of the present invention.

As shown in FIG. 1, the laser rod of the present invention comprises a central cylindrical portion 11 and two annular portions 13 and 15. The portions 11, 13 and 15 are formed to be contiguous and are fused together. Each of the portions 11, 13 and 15 is formed of laser glass but the doping of each of the portions is such that the outer annulus 15 has the highest index of refraction. The annulus 13 has a slightly lower index of refraction than the annulus 15 and the cylindrical portion 11 has a slightly lower index of refraction than the annulus 13. The differences in the index of refraction between the adjacent annuli 13 and 15 or between the annulus 15 and the cylinder 11 is preferably about one part in a thousand, or in other words, about 0.1 percent. The different indices of refraction in the different portions of the rod can be achieved by varying the doping levels in each of the portions of the glass laser rod. For example, in a glass laser rod doped with neohymium, a change in the doping level of neodymium of one-half percent by weight will produce a change in the index of refraction of about 0.1 percent. Accordingly, the outer annulus 15 could be doped with 6 percent by weight of neodymium, the annulus 13 could be doped with 5.5 percent by weight of neodymium, and the central core could be doped with 5 percent by weight of neodymium to achieve the desired differences in indices of refraction. Preferably, the rod is clad in a thin layer of lossy material such as samarium-doped glass not shown. This cladding preferably has an index of refraction slightly higher than the index of refraction of the outermost annulus of laser material to limit the laser beam spread from the outermost annulus.

With the laser rod constructed in this manner, a light ray represented by the arrow 17 travelling generally parallel to the axis of the laser rod in the annulus 15 and deflected toward the axis of the laser rod by the thermal lensing effect described above will experience total internal reflection at the interface between the annulus 15 and the annulus 13. After reflecting from this interface, it will again be bent back towards this interface to be reflected again from the interface. Thus, the light ray is trapped in the annulus 15 by a combination of the thermal lensing effect and the total internal reflection which occurs at the interface between the annulus 15 and the annulus 13. A similar entrapment of light rays will occur in the annulus 13 with total internal reflection taking place at the interface between the annulus 13 and the cylindrical core 11. The total internal reflection at the interfaces between the annuli 15 and 13 and the cylinder 11 prevents the light rays from being focused to the center of the laser rod. The differences between the indices of refraction are small enough so pump light from the pumping source is not significantly reduced in the center of the rod. In addition, the doping in the core 11 is not much lower than the doping in the outermost annulus. Because the central region of the rod has less doping, it will have less gain thereby having a further mitigating effect on the thermal focusing phenomenon. The cylindrical core 11 is made small enough so that not enough energy is contained in the core 11 to cause trouble due to the thermal lensing effect. Alternatively, the central core 11 can be made small enough so that diffraction counteracts the thermal lensing. This will occur when the Fresnel number is less than or equal to approximately 10. The Fresnel number $N$ is related to the diameter $D$ of the central core and the length of the laser rod $L$ such that $N=(D^2/4L\lambda)$, $\lambda$ being the wavelength of the laser emissions in the rod. For a typical rod having a length of 25 centimeters with $\lambda$ being 1 micron, the diameter of the central core 11 can be 3 millimeters.

The thickness of each of the annuli 13 and 15 should not be so small that diffraction losses are excessive. Since total internal reflection occurs from one side of each annulus and thermal lensing bends the light toward this side, diffraction losses are small. For a 25 centimeter rod the widths of the annuli 13 and 15 of about 1 millimeter are preferable. The annuli can be designed so that they all have the same area of cross section, which area is chosen to be small enough to prevent any thermal lensing within each annulus.

Figure 3:
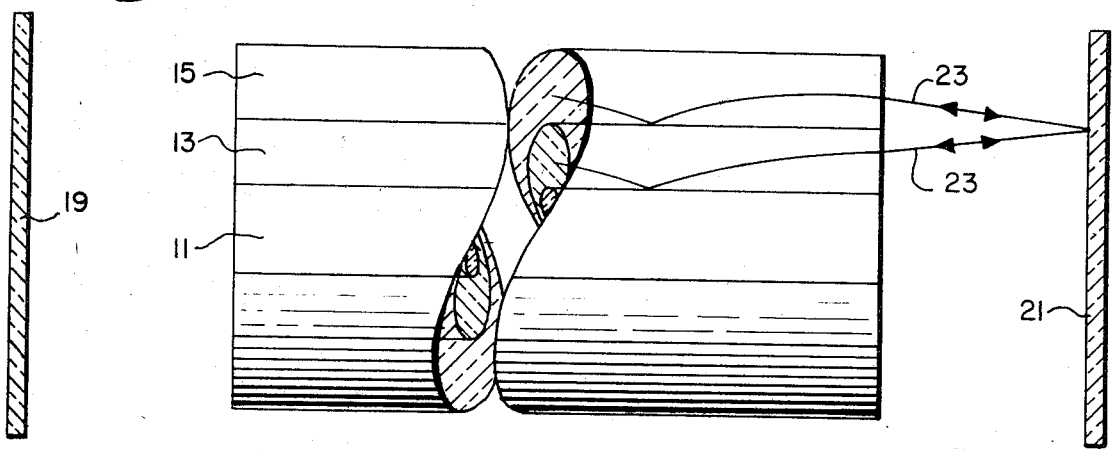
FIG. 3 is a schematic view of the laser rod of the present invention in a laser cavity with the middle portion of the rod broken away.

FIG. 3 illustrates the laser rod of the present invention in a laser cavity defined by mirrors 19 and 21. The flashlamp for pumping the laser rod to excite it to a laser state is not shown. When the laser material of the rod has been excited to a laser state, the material will spontaneously emit light of a particular wavelength. Moreover, when light of this particular wavelength passes through the excited laser material, it will stimulate further emissions of light of the same wavelength, which further emissions will be in phase with the stimulating light. As a result, light of the particular wavelength passing through the laser material will be amplified in intensity. Thus, the light which is spontaneously emitted by the excited laser material of the rod will be amplified as it travels through the rod. Because of the longitudinal configuration of the rod, a preferred direction for the amplified laser light will be parallel with the axis of the laser rod. This amplified laser light will be the light which is trapped in the annuli 13 and 15 by the combined effects of the total internal reflection at the interfaces between the annuli and the core 11 and the thermal lensing in the rod. This light which is entrapped in the annuli will be reflected back into the rod by the mirrors 19 and 21 for further amplification. As a result, standing waves of light energy, called laser oscillations, will be set up in the laser cavity defined by the mirrors 19 and 21. One of the mirrors 19 and 21 is made only partially reflective to permit part of the light from the laser oscillations to be transmitted to the target. Laser light coming out of the rod parallel to the axis of the rod will be reflected back into the same annulus. Some of the light rays, such as the one following the path 23, may reflect in such a way to be captured in a different annulus. Others may be reflected in a way to be lost entirely on one pass in which case they do not remove much of the laser energy from the rod.

In accordance with another embodiment of the invention, the central core 11 instead of being made of laser glass is made of lossy material such as samarium-doped glass, which is used for glass laser rod cladding. The index of refraction of the core 11 when it is made of lossy material will still be made slightly lower than the index of refraction of the annulus 13 so that total internal reflection occurs at the interface between the core 11 and the annulus 13. With the core made of lossy material, no focusing can occur in the core. In addition, off axis spontaneous emissions impinging on the interface at the central core at an angle greater than the total internal reflection angle will pass through the core and be suppressed. This embodiment is useful in high-gain systems where it is desirable to reduce off axis amplified spontaneous emission depletion and the external cladding is either insufficient for this purpose or not desired for some reason.

The above-described laser rods effectively eliminate thermal focusing in the laser rod and, accordingly, the rods can be pumped at 10 times the rate that the rods of prior art can be pumped. When the rod is clad in a layer of lossy material having a higher index of refraction that the outermost annulus as described above, the beam spread from the outermost annulus is less than $\theta = \sqrt{N_1^2 - N_2^2}$, in which $N_1$ and $N_2$ are the indices of refraction of the outermost annulus and the next adjacent inner annulus. For a difference in indices of refraction of one part in a thousand, $\theta$ is about 80 milliradians. Because no thermal focusing is present, the beam spread can be made as low as permitted by the diffraction limit. For example, in a rod having a diameter of 6 millimeters a beam spread of 1 milliradian can be achieved.

By using the laser rods of the present invention, existing single-shot systems can be converted to repetitive-shot systems. A single-shot system is one which is designed to be pumped once and then is allowed to cool to equilibrium before being pumped again. Such a system can be converted to a repetitive-type system simply by replacing the laser rod thereof with a laser rod constructed in accordance with the present invention.

Laser systems using the laser rods of the present invention can be aligned while they are cold and the alignment will be the same as that when the laser rod is being pumped repetitively.

Figure 2:
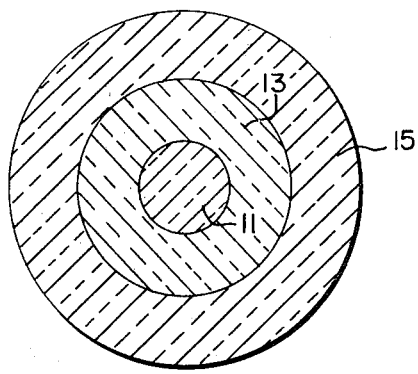
FIG. 2 is a cross-sectional view taken along the lines 2—2 of FIG. 1.

Although only two annuli have been shown in the specific embodiment illustrated in FIGS. 1-3, a larger number of annuli may be used with each annulus having a slightly higher index of refraction than the adjacent inner annulus. Alternately only a single annulus could be used in combination with the core having a lower index of reflection. In other alternative constructions, one or more of the inner annuli of the composite rod could be made of lossy material rather than laser material to perform the same function as the cladding.

These and many other modifications may be made to the above-described specific embodiment of the invention without departing from the spirit and scope of the invention, which is defined in the appended claims.

I claim:

1. A laser system comprising an annulus of laser material, having a radial thickness of at least on the order of 1 millimeter, means to provide a surface at the inner cylindrical side of said annulus reflective to laser light within said annulus whereby a laser light ray traveling generally parallel with the axis of said annulus through said annulus and focused toward said axis by thermal lensing in said annulus experiences total internal reflection at said surface to maintain said laser light ray within said annulus, and means to cause laser rays to pass through said annulus parallel to the axis of said annulus.

2. A laser rod as recited in claim 1 wherein said laser material is glass.

3. A laser rod comprising an annulus of laser material having a radial thickness at least on the order of 1 millimeter, a cylindrical core within said annulus contiguous therewith, the material of said core adjacent to the interface between said core and said annulus being light-transmissive and being of a lower index of refraction than the laser material in said annulus to thereby make said interface reflective to laser light within said annulus whereby a laser light ray traveling generally parallel with the axis of said annulus through said annulus and focused toward said axis by thermal lensing in said annulus experiences total internal reflection at said interface to maintain said laser light ray within said annulus.

4. A laser rod comprising an annulus of laser material, a cylindrical core of laser material within said annulus contiguous therewith, the material of said core adjacent to the interface between said annulus and said core having a lower index of refraction than the laser material in said annulus to thereby make said interface reflective to laser light within said annulus whereby a laser light ray traveling generally parallel with the axis of said annulus through said annulus and focused toward said axis by thermal lensing in said annulus experiences total internal reflection at said interface to maintain said laser light ray within said annulus.

5. A laser rod comprising a plurality of contiguous annuli of laser material, a cylindrical core within said annuli and contiguous with the innermost annulus of said annuli, the material of said core adjacent to the interface between said core and said innermost annulus being light-transmissive and being of a lower index of refraction than the laser material in said innermost annulus to thereby make said interface reflective to laser light within said innermost annulus, said annuli having increasing higher indices of refraction progressing outwardly from the axis of the laser rod, whereby a laser light ray traveling generally parallel with the axis of said annuli through one of said annuli and focused toward said axis by thermal lensing in such annulus experiences total internal reflection at the interface at the inner edge of said annulus to maintain said laser light ray within such annulus.

6. A laser rod as recited in claim 3 wherein said cylindrical core is lossy material inhibiting laser emissions passing therethrough.

7. A laser rod as recited in claim 4 wherein the laser material of said annulus and said core is glass and wherein said annulus and said core have different levels of doping to achieve different indices of refraction in said core and said annulus.

8. A laser rod as recited in claim 5 wherein the laser material of said annuli is glass and wherein said annuli have different levels of doping to achieve said different indices of refraction.

9. A laser rod as recited in claim 5 wherein said core is made of laser material.

10. A laser rod as recited in claim 5 wherein said core is made of lossy material to inhibit laser emissions passing therethrough.

11. A laser system as recited in claim 1 wherein said means to cause laser rays to pass through said annulus comprises means defining a laser cavity passing through said annulus parallel to the axis of said annulus.

* * * * *